United States Patent [19]

King

[11] 4,057,906
[45] Nov. 15, 1977

[54] NAVIGATIONAL INSTRUMENTS

[76] Inventor: Richard Creighton King, Rozel, 19 The Drive, East Preston, Littlehampton, Sussex, BN16 1QL, England

[21] Appl. No.: 651,621

[22] Filed: Jan. 23, 1976

[30] Foreign Application Priority Data

Feb. 12, 1975 United Kingdom ............... 5864/75
Oct. 17, 1975 United Kingdom ............. 42590/75

[51] Int. Cl.² .................. G01C 1/00; G01C 21/00
[52] U.S. Cl. ........................... 33/278; 33/274; 33/285
[58] Field of Search ............. 33/263, 264, 272, 274, 33/276, 278, 280, 285

[56] References Cited

U.S. PATENT DOCUMENTS 1,393,891  10/1921  Hansen ............................ 33/285
2,328,517  8/1943   Van Opel ......................... 33/274
2,697,234  12/1954  Sturdevant ....................... 33/280

Primary Examiner—Steven L. Stephan
Attorney, Agent, or Firm—Eyre, Mann, Lucas & Just

[57] ABSTRACT

A portable navigational instrument has edge portions which are adjusted so that the instrument's orientation with respect to a vessel can be maintained constant in different positions within the vessel's wheelhouse. Bearings of objects are determined by a sighting arrangement which co-operates with a scale which is set in accordance with the vessel's steering compass bearing, corrected for deviation, whereby the need for a compass on the instrument is avoided. The sighting arrangement can comprise a single visible sight, and/or three such sights enabling horizontal angles between objects to be determined from a further scale, and/or a radio direction finding aerial.

18 Claims, 5 Drawing Figures

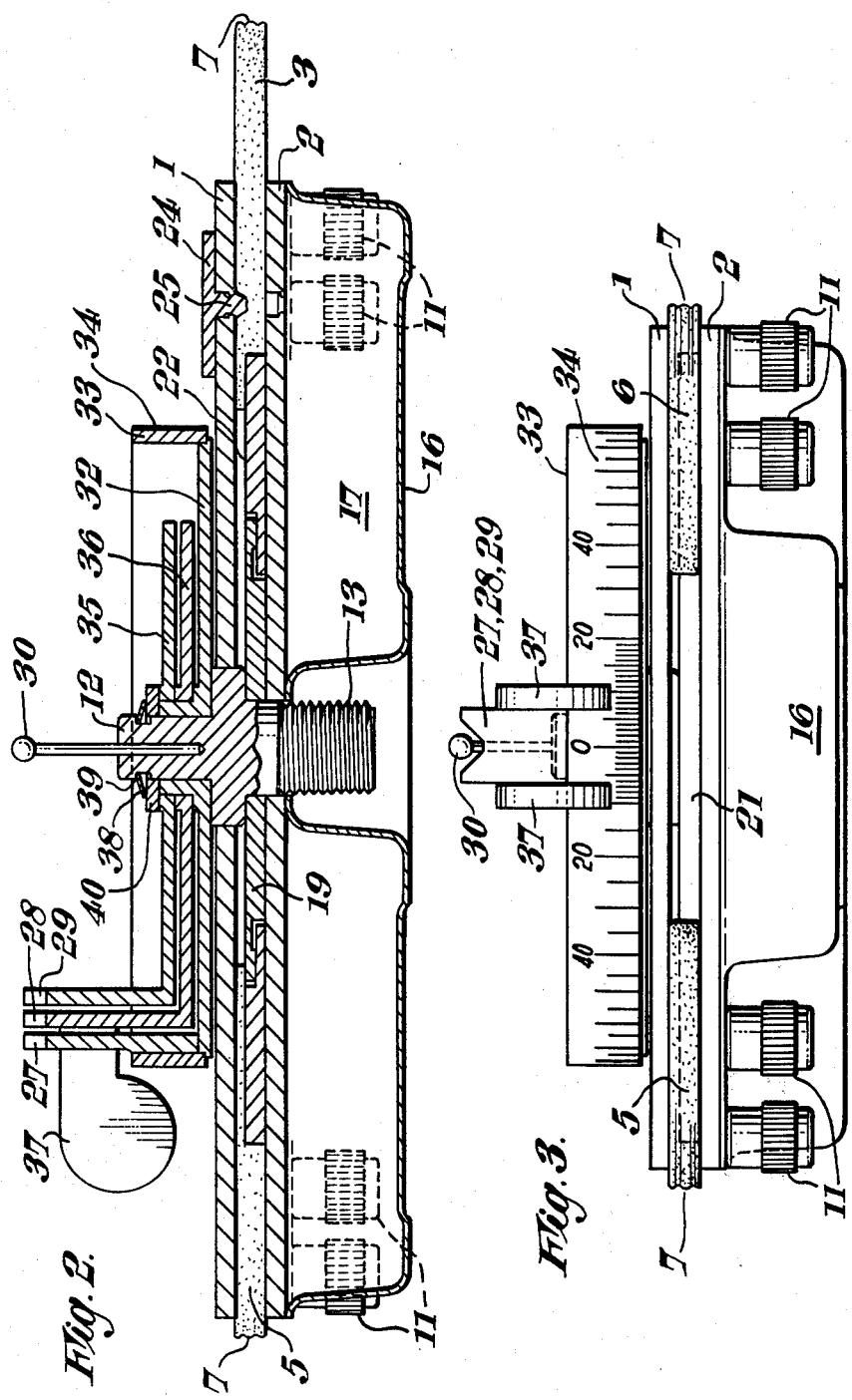

NAVIGATIONAL INSTRUMENTS

This invention relates to navigational instruments, and is particularly concerned with a navigational instrument which enables bearings to be taken and horizontal angles to be measured quickly and accurately for determining the position of a vessel, such as a boat or ship, from charted objects.

Of the various methods which may be used to determine a vessel's position, the most accurate is that in which the horizontal angles between three charted objects are measured at the vessel and are applied to a so-called station pointer, comprising three arms which are pivotable about a common centre, so as to plot the vessel's position on a chart of the area. This is done by adjusting the arms of the station pointer so that the angles therebetween correspond to the measured angles and placing the station pointer on the chart so that the three arms pass through the positions of the charted objects, whereupon the common centre denotes the vessel's position at the time of measurement of the angles.

The horizontal angles may be measured by using a sextant in the horizontal plane by measuring first the angle between the centre and the left-hand objects and subsequently the angle between the centre and right-hand objects. However, this gives rise to a delay between measuring the two angles and this delay gives rise to an error in determining the vessel's position. This error may be significant in the case of fast-moving vessels. Furthermore, a sextant is an expensive instrument and is not carried by all vessels.

Alternatively, the angles may be measured by means of an azimuth ring mounted upon the steering compass of the vessel, but since the steering compass must be positioned in front of the wheel position in the wheelhouse of the vessel it is not possible to have clear all-round vision because of the structural obstructions of the wheelhouse itself. Larger ships usually have a so-called standard compass mounted above the wheelhouse or in a position where there is all-round visibility, but this is not practical on small vessels.

For small vessels it is usual to use a small portable hand bearing compass to take bearings from a position within the wheelhouse or on the vessel's deck, but there is usually a delay between taking and making a note of each bearing because of the damped movement of the compass card, and the compass may take time to settle down in rough sea conditions. Furthermore, it is essential when using a hand bearing compass to sight all objects from precisely the same position, because moving to another position would change the deviation of the compass by an unknown amount, the deviation of the compass being affected for example by the proximity of the structure of the vessel. This requirement generally necessitates the hand bearing compass being used, even in bad weather conditions, in an exposed position on the vessel's deck.

Thus these known methods of measuring horizontal angles and taking bearings have disadvantages in that either the measuring instrument is in a permanently fixed position so that its use is inconvenient or the instrument is portable and consequently is liable to error.

It is an object of this invention to provide a portable navigational instrument by means of which the measurement of horizontal angles and/or the taking of bearings can be achieved more accurately and conveniently than hitherto.

According to this invention there is provided a portable navigational instrument comprising a supporting body having edge portions which are shaped or adjustable to correspond to transparent sides and/or ends of a wheelhouse of a vessel, whereby the instrument may be placed against any of said sides and/or ends of the wheelhouse without its orientation with respect to the vessel changing, and means supported by the supporting body for sighting an object and determining the bearing of the object with respect to the vessel and/or another object.

As used herein the expression "means for sighting an object" is intended to include any means for detecting or enabling the detection of electromagnetic radiation emitted by or reflected from an object. Thus such means may comprise, for example, a visible sighting arrangement and/or means for detecting radio signals.

The portable nature of the instrument and the shaped or adjustable nature of the edge portions enables the instrument to be used at various different positions within the wheelhouse of the vessel. Thus objects which have widely different bearings with respect to the vessel can readily be sighted without obstruction by parts of the vessel and without the necessity to carry out the sighting from an exposed position on the deck of the vessel. Since the bearing of each object is determined with respect to the vessel and/or another object and not by means of a compass with respect to magnetic North, the provision on the instrument of a magnetic compass, which would be subject to unknown and variable and hence unacceptable deviation when provided on a portable instrument, is avoided.

This provides a simple and conveniently adjustable form for said edge portions.

Preferably the supporting body comprises two spaced plates disposed one above the other and a plurality of members which are adjustably pivotably mounted between said two plates and which project from the extremeties of said plates, said members constituting said edge portions of the supporting body. Preferably each of said members has a corrugated or ribbed edge so that slipping of the instrument against said sides and/or ends of the wheelhouse is inhibited.

Preferably said means for sighting an object and determining the bearing of the object includes a rotatable circular scale and a fixed pointer which is arranged to co-operate with said scale and which points in a direction corresponding to the heading of the vessel when the instrument is placed against any of said sides and/or ends of the wheelhouse without its orientation with respect to the vessel changing. This enables the heading of the vessel to be set on the scale, which heading may be corrected for the known deviation of the vessel's steering compass and possibly also for magnetic variation. Advantageously at least one of said two plates is transparent and said rotatable circular scale is disposed between said two places and can be read through the transparent plate.

Preferably said means for sighting an object and determining the bearing of the object includes a boss which is supported by said supporting body concentrically with said rotatable circular scale and a pointer which is rotatable about said boss and which co-operates with said rotatable circular scale. The pointer then indicates on the scale bearings which are relative to the vessel but which are corrected for the deviation of the vessel's steering compass.

Said means may include at least the aerial of a radio direction finding equipment which aerial is rotatable with the rotatable pointer and has a null direction which corresponds to the direction in which the rotatable pointer points. This enables the bearings of remote radio beacons to be determined.

Alternatively said means may include a visible sighting arrangement comprising a pair of aligned sights at least one of which sights is rotatable with the rotatable pointer and which sights are aligned in a direction which corresponds to the direction in which the rotatable pointer points. This enables the bearings of visible objects to be determined.

Advantageously said means includes three pointers which are rotatable independently of one another about said boss and each of which co-operates with said rotatable scale, wherein the visible sighting arrangement comprises three pairs of aligned sights, wherein at least one sight of each pair of sights is rotatable with a respective one of the rotatable pointers, and wherein the sights of each pair of aligned sights are aligned in a direction which corresponds to the direction in which the respective rotatable pointer points. The bearings of three visible objects can then be determined in a short time during which the vessel can move relatively little, the bearings being read from the instrument subsequent to the sighting of the objects. This is of particular advantage in fast-moving vessels where delay between the sighting of different objects gives rise to considerable errors.

Preferably said means includes a further circular scale which is rotatable with one of the three rotatable pointers and has a zero mark which corresponds to the direction in which the sights associated with said one of the pointers are aligned, and wherein means are provided for indicating on said further scale the relative directions in which the sights associated with the other two of the rotatable pointers are aligned. This enables the horizontal angles between three visible objects to be determined quickly and accurately. The means for indicating on the further scale may be constituted by the sights themselves.

The number of sights provided on the instrument is conveniently reduced if one sight of each pair of sights is constituted by a common fixed sight member disposed centrally of said boss. Advantageously the three rotatable pointers and the associated sights which are rotatable with the pointers are disposed adjacent one another whereby they can be combined to form a single rotatable pointer and associated sight. This facilitates the determination of bearings of objects individually. In addition in this case or when only one rotatable pointer is provided preferably said means further includes at least the aerial of a radio direction finding equipment and means for supporting the aerial for rotation with the rotatable pointer with a null direction of the aerial corresponding to the direction in which the rotatable pointer points. Thus again the bearings of remote radio beacons can be determined.

In an alternative form of the instrument said means for sighting an object and determining the bearing of the object comprises three pairs of aligned sights which are rotatable independently of one another about a common centre and a circular scale which is rotatable with one of the pairs of sights and has a zero mark which corresponds to the direction in which the sights constituting said pair of sights are aligned, and wherein means are provided for indicating on said scale the relative directions in which the sights constituting the other two pairs of sights are aligned. This enables only the horizontal angles between three visible objects to be determined. Again the number of sights is conveniently reduced if one sight of each pair of sights is constituted by a common sight member disposed at said common centre.

The instrument preferably includes a handle by means of which said supporting body may be held. Advantageously the handle includes a mounting by means of which the instrument may be further supported in gimballed fashion on the vessel without its orientation with respect to the vessel changing. This provides the advantage that the instrument may be used outside the wheelhouse of the vessel, or on a vessel without a wheelhouse.

The supporting body preferably includes a watertight hollow enclosure which renders the instrument buoyant, so that it will float if cast overboard. The invention will be further understood from the following description by way of example of an embodiment thereof with reference to the accompanying drawings, in which:

FIG. 2 shows a cross-sectional view of the navigational instrument without its handle, the cross-section being taken on the line II—II shown in FIG. 1;

FIG. 3 shows an end elevation of the navigational instrument again without its handle;

Figure 1:
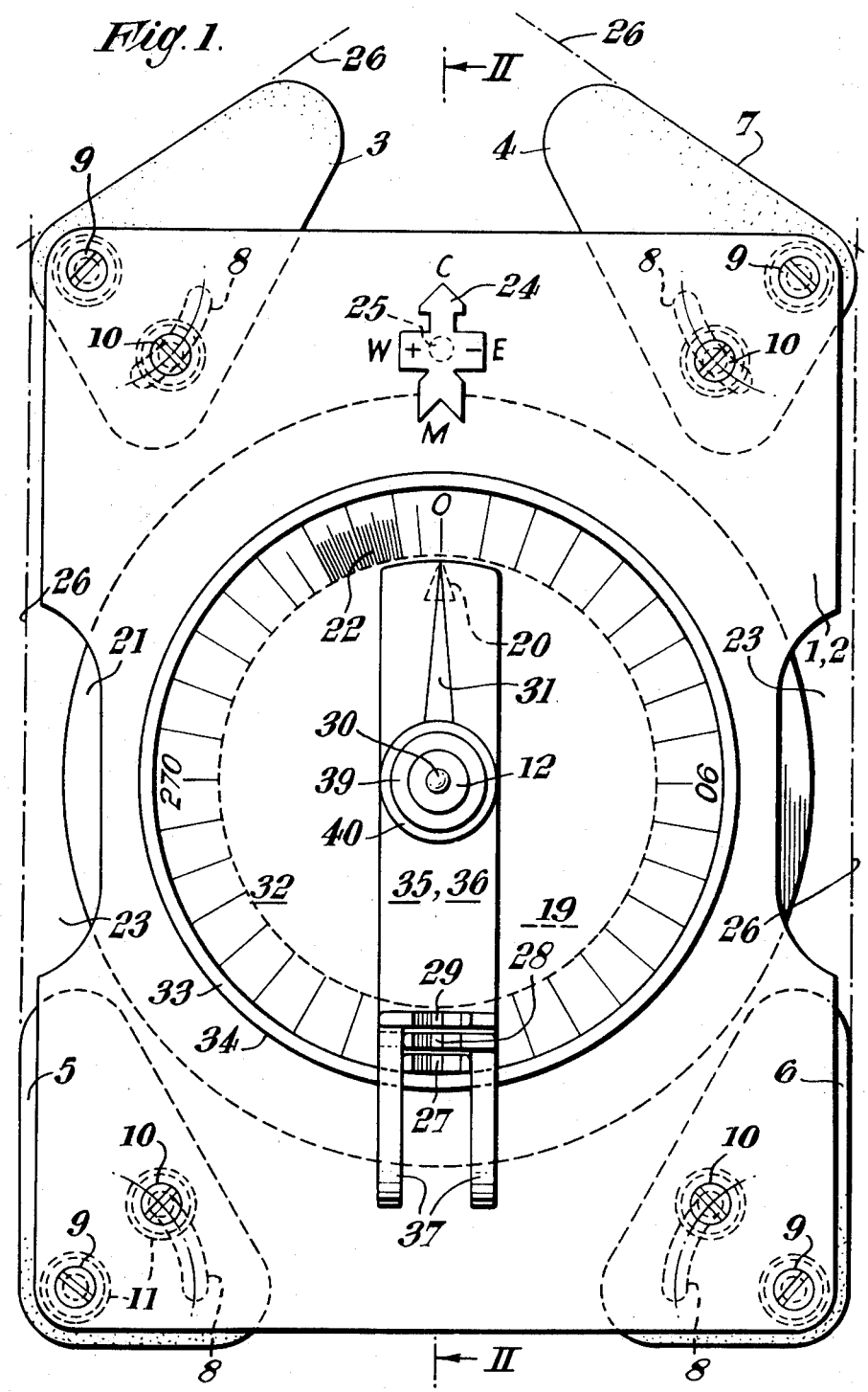
FIG. 1 shows a plan view of a navigational instrument in accordance with the invention.

Referring to the drawings, the navigational instrument comprises a supporting body which includes two generally rectangular plates 1 and 2 at least the upper plate 1 of which is of optically transparent material. The supporting body also includes edge portions which are constituted by four similar generally triangular members 3, 4, 5, and 6 which are pivotably mounted between the plates 1 and 2, which plates are consequently spaced apart from one another, in such a manner that the members 3 to 6 project from the extremeties of the corners of the plates 1 and 2. Each of the members 3 to 6 is formed from a hard rubber material and has ribbed or corrugated edges 7 as is shown in FIGS. 2 and 3. Each of the members 3 to 6 is provided with a hole for its pivotable mounting, which hole can not be seen in the drawings, and an arcuate slot 8 which extends for an angle of 45° about the mounting hole, and is mounted between the plates 1 and 2 by means of two screws 9 and 10 which pass respectively through the mounting hole and the slot 8 and which are secured by nuts 11 beneath the plate 2. Each of the members 3 to 6 is thus adjustably pivotable through a limited angle about its mounting hole, and may be fixed in any position by tightening the nuts 11 of the screws 9 and 10. As shown in the drawings the members 3 and 4 are pivoted forward from positions in which their outer edges 7 are parallel to the edges of the plates 1 and 2, whereas the members 5 and 6 are disposed with their outer edges 7 parallel to the edges of the plates 1 and 2. However, it should be noted in particular that in all pivotable positions of the members 3 to 6 these members extend beyond the extremeties of the plates 1 and 2 and form the extremeties of the navigational instrument.

Figure 4:
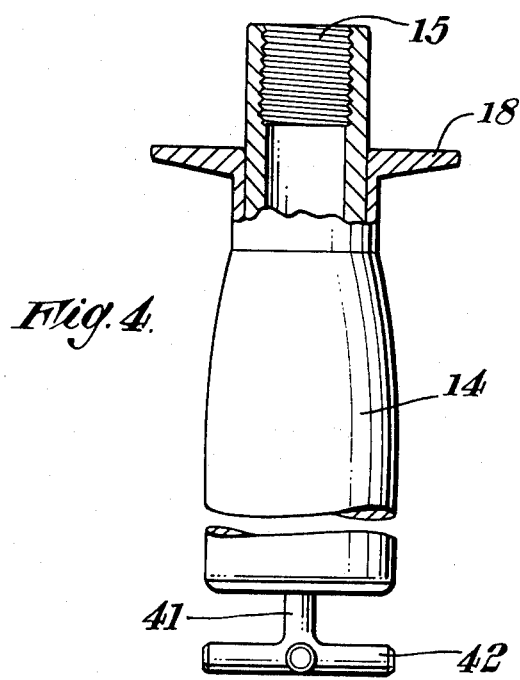
FIG. 4 shows a part-sectional view of a handle of the navigational instrument.

The plates 1 and 2 carry a central bush 12 a lower part 13 of which beneath the lower plate 2 is threaded as shown in FIG. 2. The handle, which is shown in FIG. 4 and is referenced 14, has a correspondingly threaded upper portion 15 by means of which the handle 14 may be screwed onto the part 13 of the bush 12 and thereby secured to the plates 1 and 2 of the navigational instrument. The handle 14 can be of any convenient shape and serves to facilitate the holding of the navigational instrument. Beneath the lower plate 2 the instrument is provided with a member 16, which may for example be a plastics moulding, which together with the lower plate 2 forms a water-tight hollow enclosure 17 beneath the plate 2 in those regions which are not occupied by the nuts 11, the bush 12, and the handle 14 when this is screwed into place. The handle 14 is provided with a flange 18 which abuts against the member 16 when the handle is screwed into place.

A fixed circular ring 19, which carries a fixed indicating mark 20, is mounted on the bush 12 and between the plates 1 and 2. A rotatable annulus 21, also disposed between the plates 1 and 2, surrounds the ring 19 and carries a 0°-360° scale 22 thereby forming a so-called azimuth ring. The long sides of the plates 1 and 2 are cut-away in the regions of the centres thereof in order to form recesses 23 into which parts of the periphery of the annulus 21 extend whereby the annulus 21 may be readily rotated by hand about the fixed ring 19.

A pointer 24 which carries + and − indicia on its respective sides is also rotatably mounted on the upper plate 1 by means of a spigot 25 on the pointer 24 which spigot extends through a corresponding hole in the plate 1. Surrounding the pointer 24 the plate 1 is provided with indicia C, M, E, and W, these indicia denoting compass, magnetic, east, and west respectively. The purpose of the pointer 24 is explained below.

Before the remaining parts of the navigational instrument are described it is expedient to describe briefly the manner in which the instrument is used. Initially the four members 3 to 6 are pivotably adjusted to positions which are such that the instrument can be placed with the plates 1 and 2 horizontal against different ones of glassed sides and/or ends of the wheelhouse of a vessel on which the instrument is being used without the orientation of the instrument changing with respect to the vessel, and in fact so that the direction from the centre of the boss 12 to the pointer 20 corresponds to the direction in which the vessel is heading. Thus for example if it is assumed that the instrument as shown in FIG. 1 is correctly adjusted for use on a particular vessel and is orientated so that the direction from the centre of the boss 12 to the pointer 20 is parallel to the vessel's heading, then it will be seen that the chain lines 26 whose orientations are determined by the positions of the members 3 to 6 will each be parallel to a respective one of the glassed parts of the wheelhouse of the vessel. The ribbed or corrugated edges 7 of the members 3 to 6 assist in preventing slipping of the instrument when it is placed against a glassed part of the wheelhouse of the vessel.

Having adjusted the members 3 to 6 as described above, at any time the heading of the vessel may be set on the azimuth ring or annulus 21. To this end the heading of the vessel is observed from the steering compass of the vessel. The steering compass is, however, subject to an error or deviation which is known from the so-called deviation card for the compass, and in setting the annulus 21 this error is compensated by adding to or subtracting from the steering compass heading the deviation for that heading determined from the deviation card thereby to produce a magnetic bearing as opposed to a compass bearing. The pointer 24 serves as a simple guide as to whether the deviation must be added to or subtracted from the compass heading; in setting the annulus 21 the pointer 24 is rotated to point from C (compass) to M (magnetic), whereby it is indicated that if the deviation is to the east it is added to and if it is to the west the deviation is subtracted from the compass heading to produce the magnetic heading. For transferring magnetic headings to compass headings the pointer 24 is rotated to point from M to C and then again provides the appropriate indication.

Having determined the magnetic heading of the vessel, this is set on the scale 22 against the fixed pointer 20 by rotating the annulus 21 about the fixed ring 19. Naturally, the annulus 21 may be set to the vessel's heading in accordance with true north, rather than magnetic north, if this is desired by making a further appropriate correction to the steering compass heading in the same manner as described above for compensating for the steering compass deviation. In any event the result is achieved that the steering compass deviation is compensated for in setting the annulus 21.

The remaining parts of the navigational instrument constitute means for sighting, visibly or by radio, an object.

The boss 12 rotatably supports three pointers each of which is associated with a respective one of three V-sights 27, 28, and 29, which V-sights all co-operate with a common sight member 30 which extends centrally from the boss 12. As shown in the drawings all three of the V-sights 27, 28, and 29 are aligned with one another to form a combined single sight, and consequently all three pointers are also aligned with one another so that in FIG. 1 only the uppermost pointer 31 can be seen.

The lowermost of the three pointers is carried by an annulus 32 of transparent material on which the associated V-sight 27 is mounted. The annulus 32 also carries an upstanding ring 33 which extends around the periphery of the annulus 32 and on the outer surface of which is provided a 0°-180°-0° scale 34. As shown in FIG. 3, the 0° degree mark of the scale 34 corresponds to the position of the V-sight 27. The uppermost pointer 31 is carried by an elongate member 35 of transparent material which carries the V-sight 29 at its end opposite the pointer. Likewise the remaining pointer is carried by a similar elongate member 36 of transparent material which carries the V-sight 28 at its end opposite the pointer. The members 35 and 36 can be moved about the boss 12 independently of the annulus 32 and the upstanding ring 33 and independently of one another. To facilitate such movement of the members 35 and 36, and also to facilitate movement of the annulus 32, each of the V-sights 28 and 29 has attached to it a respective one of two shaped extension pieces 37 which extend in the elongate direction of the members 35 and 36 one on each side of the V-sight 27 and which can conveniently be held and moved individually or together. Thus the extension pieces 37 may be gripped together and the three V-sights 27, 28, and 29 may be rotated as a combined sight about the common sight member 30, and with reference to FIG. 1 the left-hand extension piece 37 and the associated sight 29 may be moved individually in a clockwise direction and the right-hand extension piece 37 and the associated sight 28 may be moved individually in an anticlockwise direction from the V-sight 27.

The annulus 32 and the elongate members 35 and 36 are retained on the bush 12 by means of a thrust washer 38 which is engaged in a groove 39 in the bush 12 and bears against a washer 40 provided on the bush 12 above the member 35.

The navigational instrument is used to measure the horizontal angles between three objects in the following manner. With the members 3 to 6 adjusted as described above, the instrument is initially placed, with the plates 1 and 2 horizontal, against an appropriate one of the glassed sides or ends of the wheelhouse so that the direction from the centre of the boss 12 to the fixed pointer 20 corresponds to the heading of the vessel, and the extension pieces 37 are gripped together and are rotated about the boss 12 to a position in which the combined sight formd by the V-sights 27, 28, and 29 and the common sight member 30 are aligned with the centre one of the three objects. In other words this centre object is visibly sighted using the combined sight and the common sight member 30. Then, after moving the instrument to another side or end of the wheelhouse if this is necessary or desirable, such movement involving no change in the orientation of the instrument with respect to the vessel, the right-hand (as shown in FIG. 1) extension piece 37 is moved individually about the boss 12 so that the V-sight 28 is moved away from the V-sights 27 and 29 to a position in which the V-sight 28 and the common sight member 30 are aligned with the left-hand one of the three objects. In other words the left-hand object is visibly sighted using the V-sight 28 and the common sight member 30. Then, again after moving the instrument to another side or end of the wheelhouse if this necessary or desirable, the left-hand (as shown in FIG. 1) extension piece 37 is moved individually about the boss 12 so that the V-sight 29 is moved away from the V-sight 27 to a position in which the V-sight 29 and the common sight member 30 are aligned with the right-hand one of the three objects. In other words the right-hand object is visibly sighted using the V-sight 29 and the common sight member 30. The sighting of the left-hand and right-hand objects is effected without any movement of the V-sight 27 and hence the scale 34.

The actual measurement of the horizontal angles between the three objects is thus completed, and the angles may then be read from the scale 34. Since the 0° mark of this scale 34 corresponds to the position of the V-sight 27, the bearing of the centre one of the three objects is taken as being zero for the purposes of the measurement of the horizontal angles. The horizontal angle between this centre object and the left-hand object is denoted by the position around the scale 34 to which the V-sight 28 has been moved and likewise the horizontal angle between the centre object and the right-hand object is denoted by the position around the scale 34 to which the V-sight 29 has been moved. These angles can then be set on a station pointer to determine the position of the vessel as described in the introduction.

If as described above the annulus 21 is set so that the fixed pointer 20 indicates on the scale 22 the deviation-corrected heading of the vessel, it will be seen that the sighting of the three objects as described above additionally results in the bearings of the right-hand, left-hand and centre objects being indicated on the scale 22 by the pointer 31 carried by the member 35, the pointer carried by the member 36, and the pointer carried by the annulus 32 respectively. Thus the instrument not only facilitates the determination of a vessel's position by the measurement of horizontal angles but also permits the accurate measurement of the bearings of one or more objects by using the V-sights 27, 28, and 29 as a combined sight or individually as appropriate. Thus using the instrument a vessel's position can also be determined in known manner from cross bearings, transit bearing and angle, horizontal bearing and angle, and so on more readily and much more reliably than using a hand bearing compass of unknown and variable deviation.

It should be appreciated from the foregoing description that using the navigational instrument described above horizontal angles between objects and bearings of objects can be measured quickly and accurately from any convenient point and even from different points within the wheelhouse of a vessel. It should be stressed that each such measurement is achieved accurately primarily because the measurement does not involve the use of a hand bearing compass whose deviation is unknown and, as a result of the varying proximity of the structure of the vessel, varies as the compass is moved within the wheelhouse of the vessel. Thus the navigational instrument facilitates the frequent determination of the vessel's position and hence frequent checking of the steering compass of the vessel for deviation of any or all headings of the vessel so that the deviation card is kept up to date, whereby the navigation of the vessel can be considerably improved.

The navigational instrument as described above is primarily intended for use on a vessel having a wheelhouse and hence an enclosed helm position, but it can also be used on, for example, an open cockpit sailing craft which has no wheelhouse or outside the wheelhouse of a vessel which has a wheelhouse. To this end as shown in FIG. 4 the handle 14 is provided at its lower end with an extension 41 which is terminated by a cruciform member 42 the arms of which are parallel to the plates 1 and 2 when the handle 14 is screwed onto the remainder of the instrument. A locking pin and a corresponding aperture, or other suitable means, are provided on the handle 14 and/or the remainder of the instrument to ensure that, when the handle is screwed into place, one of the arms of the cruciform member 42 lies parallel to the direction from the centre of the boss 12 to the fixed pointer 20. The instrument can then be used by supporting it horizontally with the cruciform member 42 positioned within a corresponding cruciform aperture provided in a block mounted in a convenient position on a vessel with one of the arms of the cruciform aperture extending in the direction of the fore-and-aft line of the vessel, i.e. in the direction in which the vessel is heading. The cruciform member 42 and the corresponding cruciform aperture thus permit the direction from the centre of the boss 12 to the fixed pointer 21 to be accurately aligned with the vessel's heading and prevent rotation of the instrument about the axis of the boss 12 so that angles and bearings are measured accurately, but still provide a gimballed mounting of the instrument to allow for example for the angle of heel of a sailing craft when under sail.

Figure 5:
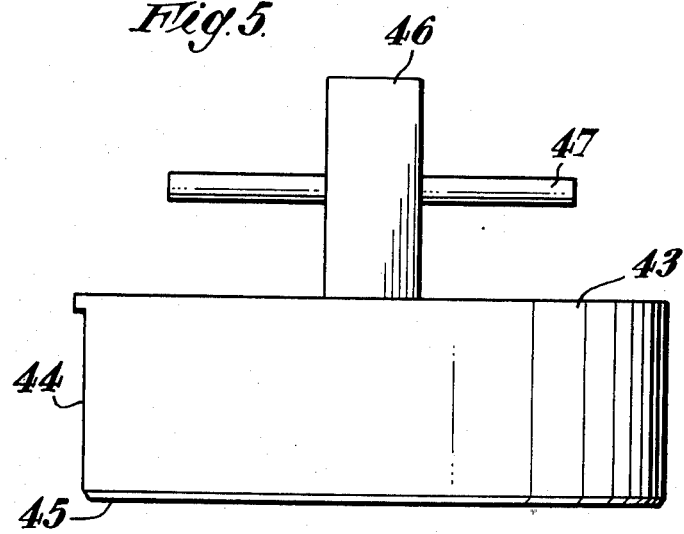
FIG. 5 shows an elevation of an additional part of the navigational instrument provided for the purposes of radio direction finding.

As so far described the navigational instrument is of use in determining the position of a vessel only when the vessel is within sight of charted objects, this not being the case when the vessel is remote from land or in reduced visibility conditions. The additional part of the navigational instrument shown in FIG. 5 permits the use of the instrument to be extended to the latter situations.

The additional part of the instrument comprises a hollow cylindrical body 43 which has a flat optically transparent top, an open bottom, and a cut-out 44 extending from its bottom edge 45 at one part of its periphery. The size and shape of the cylindrical body 43 is such that, when the V-sights 27, 28, and 29 of the navigational instrument are together (as shown in the drawings) to form a combined sight, the cylindrical body 43 may be supported in a position with its bottom edge 45 within the upstanding ring 33 and with the V-sight 27 and parts of the extension pieces 37 disposed within the cut-out 44, from which position the cylindrical body 43 can not be rotated about its axis relative to the ring 33 and hence the pointer 31 but can be rotated about the axis of the boss 12 together with the ring 33 and hence also the pointer 31.

Mounted on the cylindrical body 43 is the aerial unit 46 of, or possibly the whole of, a radio direction finding equipment which includes an elongate radio direction finding ferrite rod aerial 47. This mounting is such that when the cylindrical body 43 is supported on the navigational instrument the least sensitive or null direction of the aerial 47, i.e. the direction of the axis of the ferrite rod, corresponds to the direction indicated by the pointer 31.

In use of the navigational instrument with this additional part, with the instrument supported as described above so that the direction from the centre of the boss 12 to the fixed pointer 20 corresponds to the heading of the vessel, with the annulus 21 set to the deviation-corrected heading of the vessel, and with the cylindrical body 43 positioned on the instrument, the aerial 47 is rotated by moving the extension pieces 37 about the boss 12 until a null is detected in the radio signal received from a distant radio beacon. The bearing of the radio beacon is then indicated by the pointer 31 on the scale 22. The bearings of one or more other radio beacons are determined in the same manner and from the measured bearings and the known positions of the radio beacons the position of the vessel is determined in known manner.

Radio direction finding equipment is generally known and accordingly need not be described here, but it is observed that portable radio direction finding equipment includes a magnetic compass by means of which the bearings of radio beacons whose null signals have been detected are conventionally measured. Such a magnetic compass, like the hand bearing compass referred to above, is subject to unknown and variable deviation with consequent errors in the measured bearings, which errors are avoided by the use of the navigational instrument as described above. In addition the navigational instrument facilitates the measurement of bearings for example in the dark, because it is possible to determine a null position and subsequently to move the instrument to observe the measured bearing, this not being possible using a conventional radio direction finding equipment with a magnetic compass.

It will be appreciated that many modifications may be made to the navigational instrument described above by way of example without departing from the scope of the invention as defined in the appended claims. In particular, for example the four members 3 to 6 may be replaced by other adjustable members, for example screw threaded projections, which extend from the plates 1 and 2, or these members may be eliminated by appropriate shaping or adjustment of parts of the plates 1 and 2 themselves, or a different number of such members may be provided. The arrangement for visibly sighting objects could be completely replaced by, instead of being supplemented by, the part of the instrument provided for radio direction finding, or some other means for sighting, i.e. detecting or enabling the detection of electromagnetic radiation emitted by or reflected from, objects could be provided. In addition the gimballed mounting arrangement described with reference to FIG. 4 could be dispensed with or replaced by some other form of gimballed mounting arrangement, and the water-tight enclosure 17 which renders the instrument buoyant could be dispensed with.

Additional uses of the navigational instrument will also suggest themselves to those skilled in the art to which the invention relates. For example the radio direction finding equipment can be arranged to be responsive to v.h.f. transmitted radio signals to enable a vessel to "home" upon another vessel in poor visibility conditions or in a distress situation. In addition the instrument described above may be used for other than purely navigational purposes, for example with the members 3 to 6 adjusted to correspond to the glassed windows of a vehicle the instrument may conveniently be used to measure from different positions within the vehicle the horizontal angles between objects of land, for example for surveying or position-finding purposes.

What I Claim as My Invention and Desire to Secure by Letters Patent of the United States is:

1. A portable navigational instrument comprising a supporting body having a plurality of edge portions which form extremeties of the instrument and are angularly adjustable to angles which correspond to a plurality of walls of a vessel, said walls having arbitrary angular orientation with respect to the fore and aft axis of the vessel, and means for holding said edge portions at the angles to which they are adjusted, whereby when said edge portions are so adjusted the instrument may be placed against each one of said walls of the vessel without its orientation with respect to the vessel changing, and means supported by the supporting body for determining the bearing of the object.

2. An instrument as claimed in claim 1 wherein the supporting body comprises two spaced plates disposed one above the other and a plurality of members which are adjustably pivotably mounted between said two plates and which project from the extremeties of said plates, said members constituting said at least one of said first plurality of edge portions of the supporting body.

3. An instrument as claimed in claim 2 wherein at least one of said members has a ribbed edge.

4. An instrument as claimed in claim 1 wherein said means for determining the bearing of the object includes a scale and at least one fixed pointer which is arranged to co-operate with said scale and which points in a direction corresponding to the heading of the vessel when the instrument is placed against any of said walls without its orientation with respect to the vessel changing.

5. An instrument as claimed in claim 4 wherein the supporting body comprises two spaced plates disposed one above the other at least one of which plates is transparent and wherein said scale is disposed between said two plates and can be read through the transparent plate.

6. An instrument as claimed in claim 4 wherein said means for determining the bearing of the object includes a boss which is supported by said supporting body concentrically with said scale and at least one pointer is rotatable about said boss and cooperates with said scale.

7. An instrument as claimed in claim 6 wherein said means for determining the bearing of the object includes at least the aerial of a radio direction finding equipment which aerial is rotatable with the rotatable pointer and has a null direction which corresponds to the direction in which the rotatable pointer points.

8. An instrument as claimed in claim 6 wherein said means for determining the bearing of the object includes a visible sighting arrangement comprising a pair of aligned sights at least one of which sights is rotatable with the rotatable pointer and which sights are aligned in a first direction which corresponds to the direction in which the rotatable pointer points.

9. An instrument as claimed in claim 8 wherein said means for determining the bearing of the object includes three pointers which are rotatable independently of one another about said boss and each of which cooperates with said scale, wherein the visible sighting arrangement comprises three pairs of aligned sights, wherein at least one sight of each pair of sights is rotatable with a respective one of the rotatable pointers, and wherein the sights of each pair of aligned sights are aligned in a direction which corresponds to the direction in which the respective rotatable pointer points.

10. An instrument as claimed in claim 9 wherein said means for determining the bearing of the object includes a further scale which is rotatable with one of the three rotatable pointers and has a zero mark which corresponds to the direction in which the sights associated with said one of the pointers are aligned, and wherein means are provided for indicating on said further scale the relative directions in which the sights associated with the other two of the rotatable pointers are aligned.

11. An instrument as claimed in claim 9 wherein one sight of each pair of sights is constituted by a common fixed sight member disposed centrally of said boss.

12. An instrument as claimed in claim 9 wherein the three rotatable pointers and the associated sights which are rotatable with the pointers are disposed adjacent one another whereby they can be combined to form a single rotatable pointer and associated sight.

13. An instrument as claimed in claim 8 wherein said means for determining the bearing of the object further includes at least the aerial of a radio direction finding equipment and means for supporting the aerial for rotation with the rotatable pointer with a null direction of the aerial corresponding to the direction in which the rotatable pointer points.

14. An instrument as claimed in claim 1 wherein said means for determining the bearing of the object comprises three pairs of aligned sights which are rotatable independently of one another about a common centre and a scale which is rotatable with one of the pairs of sights and has a zero mark which corresponds to the direction in which said sights constituting said pair of sights are aligned, and wherein means are provided for indicating on said scale the relative directions in which the sights constituting the other two pairs of sights are aligned.

15. An instrument as claimed in claim 14 wherein one sight of each pair of sights is constituted by a common sight member disposed at said common centre.

16. An instrument as claimed in claim 1 and including a handle by means of which said supporting body may be held.

17. An instrument as claimed in claim 16 wherein the handle includes a mounting by means of which the instrument may be further supported in gimballed fashion on the vessel without its orientation with respect to the vessel changing.

18. An instrument as claimed in claim 1 wherein said supporting body includes a water-tight hollow enclosure which renders the instrument bouyant.

* * * * *